United States Patent [19]

Hueser et al.

[11] Patent Number: 5,212,617
[45] Date of Patent: May 18, 1993

[54] CIRCUIT FOR COMPENSATING VERY FAST CURRENT FLUCTUATIONS

[75] Inventors: Klaus Hueser, St. Peter-Ording; Bernd Bodig, Schwieberdingen, both of Fed. Rep. of Germany

[73] Assignee: Robert Bosch GmbH, Stuttgart, Fed. Rep. of Germany

[21] Appl. No.: 879,055

[22] Filed: Apr. 30, 1992

Related U.S. Application Data

[63] Continuation of Ser. No. 604,782, Oct. 26, 1990, abandoned.

[30] Foreign Application Priority Data

Dec. 29, 1989 [DE] Fed. Rep. of Germany ....... 3943279

[51] Int. Cl.⁵ .............................................. H02H 9/04
[52] U.S. Cl. ........................................ 361/56; 361/91; 361/111
[58] Field of Search ............................ 361/56, 91, 111

[56] References Cited

U.S. PATENT DOCUMENTS

| | | | |
|---|---|---|---|
| 4,061,928 | 12/1977 | Kessler | 307/200 B |
| 4,079,211 | 3/1978 | Janssen | 179/81 R |
| 4,527,213 | 6/1985 | Ariizumi | 361/56 |
| 4,705,322 | 11/1987 | Yiannoulos | 361/91 |
| 4,742,422 | 5/1988 | Tigges | 361/45 |
| 4,755,737 | 7/1988 | Komurasaki et al. | 322/99 |
| 4,901,184 | 2/1990 | Ishii et al. | 361/86 |
| 4,930,036 | 5/1990 | Sitch | 361/56 |
| 4,979,071 | 12/1990 | Ito et al. | 361/56 |
| 5,012,317 | 4/1991 | Rountre | 357/38 |

Primary Examiner—Steven L. Stephan
Assistant Examiner—B. Davidson
Attorney, Agent, or Firm—Michael J. Striker

[57] ABSTRACT

A circuit for neutralizing very fast current fluctuations in a power consumer circuit, such as an integrated circuit having a pair of input or output conductors includes a bipolar transistor 17 whose collector is connected via a parallel connection of a semiconductor diode and a resistor to one of the conductors. The emitter of the transistor is grounded and the base is connected to the other conductor. Another parallel connection of a diode and a resistor is connected between the two conductors to bias the transistor to a preset current when a standard current of a constant magnitude flows through the consumer circuit. If current surges or breaks occur in the standard current, the preset current flowing through the collector resistor undergoes corresponding changes and a compensating current is very fast loaded to the conductors through the capacitance of the barrier layer of the p-n junction of the collector diode to neutralize the changes of the standard current.

2 Claims, 1 Drawing Sheet

CIRCUIT FOR COMPENSATING VERY FAST CURRENT FLUCTUATIONS

This application is a continuation of application Ser. No. 604,782, filed Oct. 26, 1990 now abandoned.

BACKGROUND OF THE INVENTION

The invention relates to a circuit for neutralizing very fast current fluctuations which may occur in a pair of conductors of a power consumer circuit, such as a microprocessor or CMOS-circuit. In consumer circuits of this kind, strong current peaks or breaks occur in parts of working cycles when in a very short time interval (in a nanosecond range) current flowing through the conductors changes about 10% above and below a standard stable value of the power consumer current. In the case of CMOS-circuits, strong current breaks take place particularly during switch-overs when a momentary short-circuit is produced.

The current changes can result both in a conductor pair for supplying energy to the circuit and in a conductor pair for an energy output.

Sources of constant current serving particularly for the prevention of current breaks or drops, and also overvoltage protecting circuits serving particularly for the prevention of current peaks or surges, are known in numerous embodiments from prior art. However, these known circuits are unsuitable for satisfactorily compensating very fast current fluctuations occurring in the nanosecond range.

SUMMARY OF THE INVENTION

It is, therefore, an object of this invention to overcome the disadvantages of the prior art circuits of this kind and to provide a circuit which satisfactorily solves the problem of compensating very fast current changes, i.e. current fluctuations on the nanosecond time scale.

In keeping with these objects and others which will become apparent hereinafter, one feature of this invention resides in a first embodiment of the compensating circuit, in the provision of a semiconductor element having a pn-junction whose barrier layer capacitance is employed as a very fast acting loading buffer i.e. a loading buffer responding in the nanosecond time range. The semiconductor element is connected in reverse or blocking direction between two power input or output conductors of a consumer circuit to be protected, and is arranged as close as possible to the consumer circuit to minimize the inductance of the pair of conductors.

In a second embodiment of the circuit for compensating very fast current fluctuations occurring in a pair of power input or output conductors of a consumer circuit to be protected, there is provided a bipolar transistor circuit arranged as close as possible to the consumer circuit and being connected between the two conductors in such a manner, that the collector of a bipolar npn transistor is connected via a parallel connection of a semiconductor diode and a resistor with one of the conductors, the emitter is grounded and the base is connected with the other conductor and is biased by another parallel connection of a diode and resistor to preset a constant standby current through the transistor when a standard stable current flows through the consumer circuit. The magnitude of the standby current is set to match a difference between the stable value of the standard current and expected peaks or breaks thereof. Due to the base resistor, current fluctuations resulting from the changes of potential difference between the conductors cause a correspondingly increased or reduced standby current flow through the collector resistor, and the difference between the preset and changed values of the standby current is rapidly discharged into the conductor pair through the capacitance of the barrier layer of the collector diode. In this manner, the bipolar transistor circuit acts as an auxiliary consumer circuit which reacts faster in response to current fluctuations than the power consumer circuit to be protected. For example, if the standard current of the power consumer circuit is 100 mA which may surge to 200 mA during a switch-over, the standby current of the transistor circuit is preset to the difference between the 200 mA and 100 mA, that is to 100 mA. If the voltage difference between the power conductors changes, the bipolar transistor delivers very quickly the compensating current into the power conductor pair.

The novel features which are considered as characteristic for the invention are set forth in the appended claims. The invention itself, both as to its construction and its method of operation, will be best understood from the following description of exemplary embodiments when read in connection with the accompanying drawings.

DESCRIPTION OF THE PREFERRED EMBODIMENTS

Figure 1:
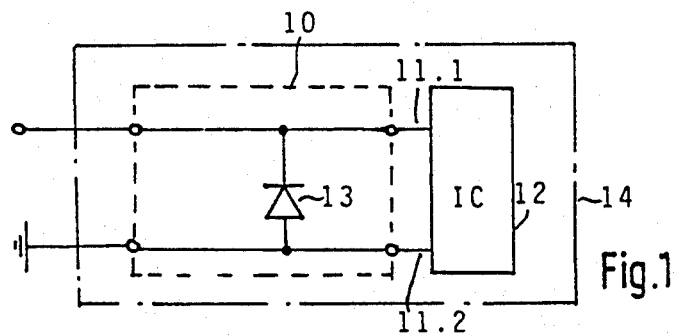
FIG. 1 shows a circuit for compensating very fast current fluctuations by means of a diode arranged as close as possible to a consumer circuit to be protected against fast current fluctuations.

FIG. 1 shows a circuit 10 for compensating very fast current fluctuations which may occur in a pair of conductors 11.1 and 11.2 leading to an electric powerconsumer circuit 12, such as a microprocessor, a CMOS-integrated circuit and the like. In this embodiment, the current fluctuations compensating circuit 10 consists only of a semiconductor diode 13 connected in blocking direction between the conductors 11.1 and 11.2. Preferably, the diode 13 is integrated in the consumer circuit 12 such that an aggregate integrated circuit 14 results.

In this circuit arrangement, the diode 13 serves as a very fast capacitor whose capacity corresponds to the capacitance value of the barrier layer of its pn-junction. In the preferred embodiment, the semiconductor diode 13 is a power diode designed for a high forward current and, consequently, has a large-area pn-junction with a large capacitance value of its barrier layer. The large capacitance of the barrier layer enables a high energy compensation of current fluctuations on the nanosecond time range in the consumer circuit. The connection wires between the pn-junction and the conductors 11.1 and 11.2 should be as short as possible in order to minimize the inductance of the connections. For this reason, the integration of the diode 13 into the aggregate integrated circuit 14 is of a particular advantage to increase the capacitance of the barrier layer of the diode, a plurality of pn-junctions can be connected in parallel.

Figure 2:
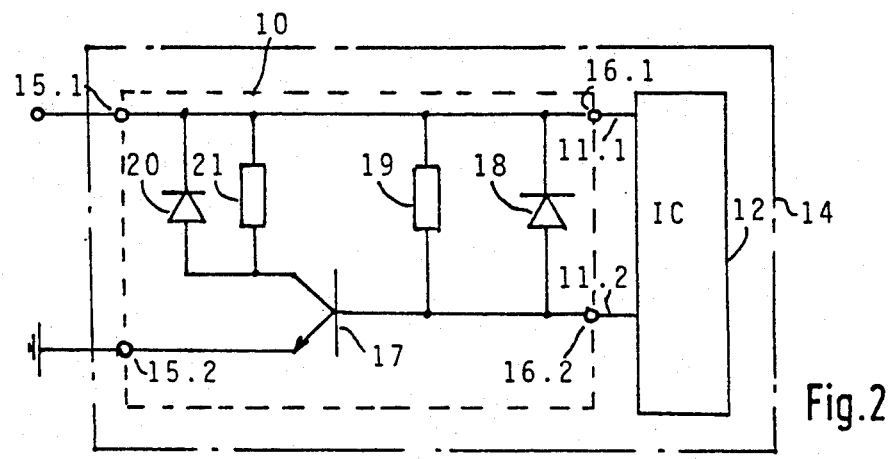
FIG. 2 shows a bipolar transistor circuit arranged as close as possible to a consumer circuit to be protected.

In the embodiment according to FIG. 2, the current compensating circuit 10 includes a bipolar transistor circuit which is also integrated with the consumer circuit 12 into an aggregate integrated circuit 14.

The current compensating circuit 10 of FIG. 2 has two input terminals 15.1 and 15.2, and two output terminals 16.1 and 16.2. The output terminal 16.1 is connected with the conductor 11.1 of the consumer circuit 12, and the other output terminal 16.2 is connected with the other conductor 11.2. The first input terminal 15.1 is connected to +5 V whereas the other input terminal 15.2 is grounded. The bipolar transistor circuit includes a bipolar npn transistor 17, a base diode 18, a base resistance 19, a collector diode 20 and a collector resistance 21. The base diode 18 and the base resistance 19 connect the base of transistor 17 with a conductor interconnecting the input terminal 15.1 and the output terminal 16.1. To the interconnecting conductor is also connected the collector of transistor 17 via the diode 20 and the collector resistance 21. The emitter of transistor 17 is connected with the grounded input terminal 15.2 while the second output terminal 16.2 is connected to the base of transistor 17.

The transistor 17 can be of any type having a high transit frequency, e.g. between 10 MHz to several GHz, such as a high speed transistor used for a tuner. For example, applicable transistor types are BFR29A or BFY90 of the firm Valvo. In the shown example, the value of base resistance 19 is about 100 Ohms to adjust, with the input voltage of 5 V, a work point of 2.5 V. The collector resistance has a value of 25 Ohm. If the transistor is operating at its work point, that is when the difference of potentials between the conductors 11.1 and 11.2 is 5 V, then a current of 100 mA flows through the collector resistance 21.

The base diode 18 serves for applying as fast as possible a switching current to the transistor 18 when the potential difference between the conductors 11.1 and 11.2 changes. If during the switchover of the consumer circuit 12 the voltage decreases due to a signal applied through the conductors 11.1 and 11.2, the transistor 17 receives a lower current, e.g. 30 mA, through the collector resistance 21. Since in this case the current flowing through the compensating circuit 10 is 70 mA less than that under normal operating conditions (at the 5 V difference of potentials between the conductors 11.1 and 11.2), these 70 mA are available as a compensating current for the consumer circuit 12. The collector diode 20 acts as a very fast acting capacitor and performs the same function as the diode 13 in the embodiment of FIG. 1.

In the circuit of FIG. 2 it is assumed that the conductors of the current compensating circuit 10 which are connected with conductors 11.1 and 11.2 of the consumer circuit 12, correspond to outputs of the current compensating circuit. Accordingly, these conductors serve for supplying power or switching pulses to the consumer circuit. In the case when these conductors act as inputs of the current compensating circuit 10 and through which energy or switching pulses are delivered from the consumer circuit, the operation is reversed but the construction and operation of the circuit 10 remains unchanged.

In the description of operation of the circuit of FIG. 2 it was further assumed, that the difference of potentials between the conductors 11.1 and 11.2, and thus the current through the conductors were subject to fluctuations. It can also occur that a voltage peak on a switching off pulse, and thus also a corresponding current peak occurs, because of the effect of inductive phenomenon. In this case the transistor 17 provides an increased current flow through the current compensating circuit 10. The quick switching action is again guaranteed by the before described properties of the pn-junctions of the base diode 18 and the npn-transistor 17.

Figure 3:
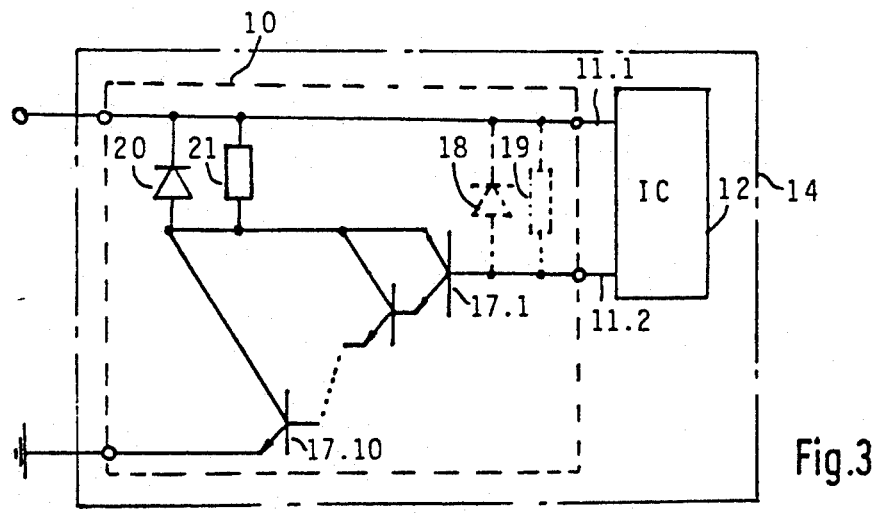
FIG. 3 is an emitter-follower circuit operating similarly as the embodiment of FIG. 1.

The embodiment of FIG. 3 provides a high current amplification by an emitter-follower circuit which includes ten npn transistors 17.1 through 17.10. A voltage drop of about 0.5 develops across each of these transistors, so that a total voltage drop of 5 V occurs between the base of the first transistor 17.1 and the emitter of the tenth transistor 17.10. The interconnected ten transistors replace the single transistor 17 of the circuit of FIG. 2. The base diode 18 and the base resistor 19 in this modification can be dispensed with, as indicated by dashed lines. The circuit without the base resistor is particularly suitable for integration with the consumer circuit. The embodiment of the invention according to FIG. 3 with or without the resistor 19, acts very fast and exhibits a high current amplification. Consequently, the current fluctuations in the conductors 11.1 and 11.2 are neutralized particularly effectively.

Instead of the illustrated npn transistors, pnp-transistors can also be used in the circuits of FIGS. 2 and 3. The selection of the transistor type depends on the time constant of current variations which may occur in the conductor pair of a consumer circuit.

In the embodiment of FIG. 3 the base resistance 19 can be eliminated provided that the emitter follower is composed of a sufficient number of transistors to match the difference of potentials between the conductors 11.1 and 11.2. In a modification it is possible to employ an emitter-follower assembled of a lower number of transistors, and having a base resistor whose ohmic value is less than that in the embodiment of FIG. 2. Also other, non-illustrated modifications of the current compensating circuit are within the scope of this invention provided that they include means for drawing a preset current during a standard current flow through a consumer circuit to be protected, and means for very rapidly lowering the preset standby current during a sudden increase of the current demand in the consumer circuit, and diverting the current difference saved in the compensating circuit to the consumer circuit. Alternatively, the present standby current can be very rapidly increased by a current surge above the standard level of the consumer circuit.

It will be also noted that capacitors can be connected parallel to the base diode 18 and/or collector diode 20. The diodes in this modification ensure a very fast switching or compensating operation at a lower power while the capacitors perform the same function but with a somewhat longer time constants and with a larger power.

We claim:

1. A circuit for compensating current fluctuations in a nanosecond range in a power consumer circuit provided with a pair of power input or power output conductors, comprising a bipolar transistor circuit connected between the conductors and being arranged as close as possible to the consumer circuit to minimize inductance of the conductors; wherein the bipolar transistor circuit includes a bipolar transistor having a collector, an emitter and a base, said collector of said bipolar transistor being connected by a semiconductor diode and also by a resistor to one conductor of the pair of conductors, said resistor being connected in parallel with said semiconductor diode; and an emitter follower connected via the semiconductor diode and the resistor between the pair of conductors; the semiconductor diode being oriented in blocking direction and having a pn-junction with a barrier layer capacitance so as to act as a nanosecond range-responding loading buffer; and the resistor being dimensioned such that the semiconductor diode loads through the barrier layer capacitance the consumer circuit to compensate the current fluctuations.

2. A circuit for compensating current fluctuations in a nanosecond range in a power consumer circuit provided with a pair of power input or power output conductors, consisting of a bipolar transistor circuit connected between the conductors and being arranged as close as possible to the consumer circuit to minimize inductance of the conductors; wherein the bipolar transistor circuit consists of a bipolar transistor having a collector, an emitter and a base, a resistor, a semiconductor diode, another resistor and another semiconductor diode; said collector of said bipolar transistor being connected by the semiconductor diode and also by the resistor to one conductor of the pair of conductors, said resistor being connected in parallel with said semiconductor diode; the semiconductor diode being oriented in blocking direction and having a pn-junction with a barrier layer capacitance so as to act as a nanosecond range-responding loading buffer; and the resistor being dimensioned such that the semiconductor diode loads through the barrier layer capacitance the consumer circuit to compensate the current fluctuations, and said base of said bipolar transistor being connected to the other conductor and also to said one conductor via the other resistor and via the other semiconductor diode oriented in blocking direction, said other semiconductor diode being connected between the conductors in parallel with said other resistor, and said emitter being grounded.

* * * * *